United States Patent
Kumar et al.

(10) Patent No.: US 7,334,223 B2
(45) Date of Patent: Feb. 19, 2008

(54) APPARATUS AND METHOD FOR AUTOMATICALLY MIGRATING CLIENT SERVER APPLICATIONS TO OTHER ARCHITECTURES AND PLATFORMS

(75) Inventors: Shrawan Kumar, Pune (IN); Arun Gajanan Bahulkar, Pune (IN); Anita Pramod Nanadikar, Mumbai (IN); Pavan Sabharwal, Mumbai (IN)

(73) Assignee: Tata Consultancy Services, Ltd., Mumbai (IN)

( * ) Notice: Subject to any disclaimer, the term of this patent is extended or adjusted under 35 U.S.C. 154(b) by 450 days.

(21) Appl. No.: 11/037,022

(22) Filed: Jan. 18, 2005

(65) Prior Publication Data
US 2005/0160399 A1 Jul. 21, 2005

(30) Foreign Application Priority Data
Jan. 19, 2004 (IN) .......................... 59/MUM/2004

(51) Int. Cl.
G06F 9/45 (2006.01)
G06F 9/44 (2006.01)
(52) U.S. Cl. ...................... 717/137; 717/136; 717/143; 717/144; 717/104
(58) Field of Classification Search ................ 717/137, 717/136, 143, 144, 104
See application file for complete search history.

(56) References Cited

U.S. PATENT DOCUMENTS 7,107,589 B1 * 9/2006 Tal et al. ..................... 717/177
7,210,132 B2 * 4/2007 Rivard et al. ................ 717/136

OTHER PUBLICATIONS

Ping, et al. "Migration of Legacy Web Applications to Enterprise Java Environments—Net.Data to JSP Transformation", 2003, IBM Canada Ltd., p. 1-15.*
Bandelloni, et al. "Flexible Interface Migration", 2004, ACM, p. 148-155.*

* cited by examiner

*Primary Examiner*—Wei Zhen
*Assistant Examiner*—Qamrun Nahar
(74) *Attorney, Agent, or Firm*—Charles A. Muserlian

(57) ABSTRACT

Method for automatically migrating power builder application to an open architecture is disclosed. The method includes converting to ASCII character format stream, parsing the stream to form constructs, generating a model from the constructs, analyzing the model and building trees in the model in the power builder format. The apparatus of the invention includes a schema of trees, one set, representing trees in the power builder format and another set in the selected open architecture format and a set of mappings defining correspondence between the two sets. Trees in one set are transformed into the other and attached in the model. An Unparser is provided having a class generator which generates classes including a global variable class in the open architecture and the classes are filled with the help of the parser and a model traverser by querying and responses thereto.

2 Claims, 1 Drawing Sheet

APPARATUS AND METHOD FOR AUTOMATICALLY MIGRATING CLIENT SERVER APPLICATIONS TO OTHER ARCHITECTURES AND PLATFORMS

FIELD OF THE INVENTION

This invention relates to apparatus and method for automatically migrating client server applications in the power builder binary format to an open architecture.

BACKGROUND OF THE INVENTION

Client server applications have been written in the past using several popular platforms like POWERBUILDER platform, VISUAL BASIC platform, VISUAL C++ platfrom and so on.—e.g. JAVA platform .Net.

In the prior art. while re-architecting, a user is typically faced with the choice of development platforms—whether to continue with the older platform or migrate to a completely new platform. Very often the choice is to also move to a newer platform, especially if the popularity of an older platform is on the wane.

Since, typically new functional requirements are not added during this process, users would like to automate this process—to reduce the cost of migration and to reduce the risk involved.

Commonly used approaches in the prior art to do this type of application migration are:

a) Document a mapping strategy—written informally (though systematically). Programmers follow this strategy and do the conversion by hand. Such a conversion is highly error prone, and the correctness depends on the programmers' ability. Also, such strategies are usually incomplete and not stated precisely enough and so a lot is left to the programmer to implement correctly. This method can provide no guarantees and relies heavily on testing.

b) Partial automated conversion based on textual patterns These are tool based implementations of some of the mappings that can be expressed as textual pattern search and replacement. While these are extremely effective where applicable, a large part of the problem cannot be solved in this manner and results in a partial solution only.

c) Conversions based on syntactic patterns These are based on knowledge of the syntax of the source programs. Conversion tools are written based on this approach. It is very effective when mapping is based on translating a program construct from one language to another. While this approach is far superior to the textual pattern based approach, it has serious limitations like:

many mappings are not expressible at the level of syntactic transformations and require semantic analysis and transformation techniques this approach is not at all suitable for making architectural changes All these approaches address the problem of platform migration (to whatever extent) but do not provide an approach to making architectural changes.

In accordance with this invention a user will have the opportunity to re-architect the applications to avail one or more of the following benefits achieve better scalability of the application enable remote customers or business partners to access their applications enable better interconnectivity between applications.

SUMMARY OF THE INVENTION

According to this invention there is provided apparatus for automatically migrating client server application in the power builder binary format to an open architecture consisting of:

[a] importer means for receiving the client server application in the power builder binary format, said importer having a converter means to convert the binary format of the application to an ASCII character format;

[b] receiver means for receiving the client server application in the ASCII format in the form of a stream of characters;

[c] a first parser for parsing the stream of characters into a plurality of tokens and creating a stream of tokens, and composing the tokens into a plurality of constructs;

[d] a model generator for receiving from the first parser the said constructs, identifying the constructs and converting the constructs into (i) user interface elements in a generic form including their global variables and the properties of the user interface elements and events defined on the user interface elements; (ii) flagged event handler elements in the power builder ASCII character format for each event in the user interface element; and (iii) inter element dependent relationships in the generic form; and mapping the generic user interface elements; the flagged event handling elements and the dependent relationships in a model;

[e] a model analyzer adapted to traverse the model and selectively pick the flagged event handler elements having constructs sequentially and further adapted to transfer the event handler elements to a tree building means;

[f] a tree building means for receiving the event handler element and its constructs; said means having a second parser means for receiving the event handling elements identifying the constructs therein and sending the constructs to a tree constructor for converting the event handling constructs into sub trees and further composing the sub trees into discrete event handling tree instances representing the power builder constructs, each tree instance corresponding to an event handling element;

[g] a first model traverser which picks up the tree instances built in the tree building means and is adapted to attach each of the discrete tree instances to an event handling element associated therewith in the model;

[h] a second model traverser adapted to traverse the model and pick the attached tree instances representing the power builder constructs;

[i] a schema of trees resident in the apparatus; said schema of trees containing a first sub set of definitions for event handling instances defining various possible trees and sub trees representing the power builder format and a second sub set of plurality of tree instances representing constructs in an open architecture format selected from C #, vb.net and JAVA programing language,

[j] a set of mappings resident in the apparatus which defines the unique corresponding of a sub tree or tree instance representing the power builder format to at least one tree and sub tree instance representing the selected open architecture;

[k] a tree translator means adapted to receive tree instances representing the power builder format from the second model traverser, search in the schema of trees for a matching tree or sub tree instance using the set of mappings and upon locating a matching tree or sub tree instance and transform the tree or sub tree instance in the power builder format to a tree instance in the selected format using the set of mappings;

[l] a third model traverser which is adapted to pick up the transformed tree instance from the tree translator and further adapted to traverse the model and still further adapted to detach the trees attached to the event handling elements representing the power builder format and replace the said detached trees with the corresponding trees in the selected format;

[m] an unparser which includes a class generator which is adapted to create classes in the selected format, a second set of mappings having a first set of rules for converting trees into concrete syntax of the selected format and a second set of rules for converting user interface elements in the generic form to concrete syntax in the selected format and a third set of rules to create a class for global variables; querying means adapted to send and receive queries relating to information required for the creation of classes and its contents including its attributes, methods and bodies;

[n] a fourth model traverser means which is adapted to pick the user interface elements in the generic format in the model and global variables and send the picked elements to the unparser for class creation; said fourth traverser means having a query responding means to respond to queries received from the querying means of the unparser and sending the responses to the unparser for selectively filling the contents of the created classes with appropriate attributes and methods based on the responses relating to the events defined in the user interface elements and interdependencies between the elements, properties of the user interface element and bodies from responses relating to trees representing the selected format of the event handling element related to the event defined on the user interface element; and after all the classes have been created, the fourth model traverser means is further adapted to pick all the global variables from the user elements in the model and to pass it to the unparser for creating a special class for all global variables;

[o] an emitter for receiving in the open architecture format the classes of the said application and transferring the same to a storage means for further use.

Thus in accordance with this invention automating requires understanding the syntax and semantics of the source and target platforms, defining mappings between source and target platforms in terms of source and target representations, defining strategies for transforming the application from older "fat client" architectures to the newer architectures. This platform understanding, platform mappings and architecture strategies are implemented as a set of tools and libraries so that automated migration is possible.

Therefore this invention provides an apparatus and method for automatically migrating client server applications to newer architectures and platforms having the following features:

Completeness of solution—The tools convert the entire source code to the target platform. When ever, for a given feature in the source platform, there are no direct equivalent features on the target platform, a solution must be provided using one or more of the following:
  i. New run time libraries
  ii. Extensions to existing controls or classes
Design is structured so that most parts of it are reusable so as to provide solutions for different source and target platforms
The Solution is specified as a set of transformations applied in a specific sequence so that transformations can be added, removed and verified easily.

The invention involves apparatus for POWERBUILDER applications which consists of the entities of the types provided by POWERBUILDER applications. The most frequently used types are as follows:
Application
Window
Various Controls like Command Button, CheckBox etc
Menu
Data Window
User Objects When one instantiates these entities, one has to provide the values of the applicable properties, defines the actions to be taken on various applicable events, provide ones own events and their way of handling. To facilitate the writing of event handling codes, some data members also needs to be defined and used.

To start with the PBL application is treated as consisting of three distinct elements: one the objects and their attributes, two the event handling elements using power script language and the three being the data access mechanism using embedded SQL or dynamic SQL.

A study is done for all the USER INTERFACE entities of PB domain and a mapping is drawn to relate each such entity to equivalent built-in class of C#. Similarly the power script language is studied and a mapping is drawn to relate the power script constructs with the equivalent C# language constructs. The data access mechanism is studied and a data access control class is built in C#. Using the features built in this class, a mapping strategy is formulated to convert the embedded sqls into dynamic sqls.

These three mappings form the backbone of the tool in accordance with this invention.

For the conversion process implemented by the tool, starting input is the .PBL file(s) constituting the application. User specifies these files in an order defined by the way one would have given if the application was to be built (creation of executable) using Power Builder. So that multiple entities having same name occurring in different .PBL files are picked up rightly as specified by the order.

At the very top level following steps are followed to convert a Power builder application to C#

Export the .PBL Files to ASCII Format

This step makes use of the API provided by Power builder itself to export the .PBL files into ASCII format. It is known that by using export facility all the information put in by user while developing the application gets externalized and dumped as a text file in a format defined by power builder. A separate ASCII file is created for each separate top level entity like window, menu, user object, data window object and the like.

An Internal Representation of the Application is Prepared

The exported ASCII files are scanned (parsed) and an in-memory model is built which captures all the attributes and relationships of the application entities. A meta model is conceptualized to represent the possible entities, their attributes and relationships in PB application domain. The in memory model is an instantiation of this meta model.

In the Next Step the Power Builder Elements are Converted to C# Elements.

Once the internal representation in model form has been created, it is traversed and suitable C# classes are generated based upon a mapping conceptualized as part of the apparatus in accordance with this invention. While processing a particular entity, all the power script code existing for event handling elements is converted to equivalent C# methods and bound with equivalent events in C#. To achieve this, a separate parser scans the power script code block and an abstract syntax tree (AST) is built from it. This tree is transformed to another tree which represents the equivalent semantic code in C#. This is based upon a mapping from Power Script constructs to C# constructs. The resulting AST is traversed and appropriate C# code is generated.

DETAILED DESCRIPTION

Figure 1:
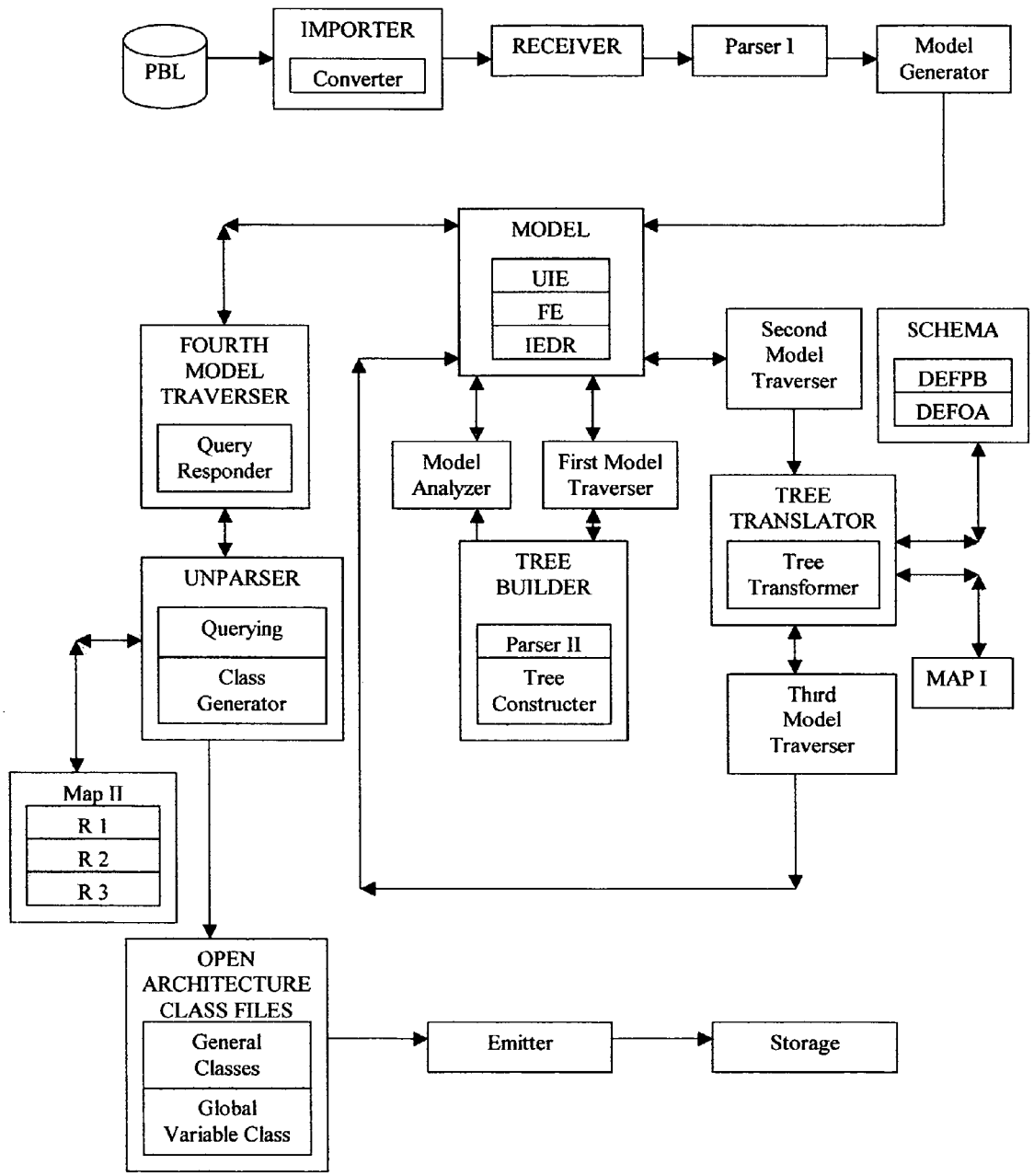
FIG. 1 is a schematic view of the apparatus in accordance with this invention.

Referring to FIG. 1 there is shown block diagram apparatus for automatically migrating client server application in the power builder binary format to an open architecture consisting of: importer means [IMPORTER] for receiving the client server application in the power builder binary format [PBL], said importer means having a converter means [CONVERTER] to convert the binary format of the application to an ASCII character format.

A receiver means [RECEIVER] is provided for receiving the client server application in the ASCII format in the form of a stream of characters from the [IMPORTER].

The receiver means transfers control to a parser [Parser I] for parsing the stream of characters into a plurality of tokens and creating a stream of tokens, and composing the tokens into a plurality of constructs. These constructs are sent to a model generator [MODEL GENERATOR] where the constructs are identified and are converted into (i) user interface elements in a generic form including their global variables and the properties of the user interface elements and events defined on the user interface elements; [UIE] (ii) flagged event handler elements in the power builder ASCII character format for each event in the user interface element [FE]; and (iii) inter element dependent relationships in the generic form [IEDR]. In the model generator the generic user interface elements; the flagged event handling elements and the dependent relationships are mapped in a model [MODEL].

A model analyzer [Model Analyzer] is provided which is adapted to traverse the model and selectively pick the flagged event handler elements having constructs sequentially and further adapted to transfer the event handler elements to a tree building means via a tree builder [TREE BUILDER] for receiving the event handler element and its constructs. The tree builder has another parser [parser II] and a tree constructer means [Tree constructer] which receives event handling elements identifying the constructs therein and sends the constructs a tree constructing means [TREE CONSTRUCTER] in the tree builder for converting the event handling constructs into sub trees and further composing the sub trees into discrete event handling tree instances representing the power builder constructs, each tree instance corresponding to an event handling element.

A model traverser [first model traverser] picks up the tree instances built in the tree building means and attaches each of the discrete tree instances to an event handling element associated therewith in the model [MODEL].

Thereafter another model traverser [Second model traverser] traverses the model and picks the attached tree instances representing the power builder constructs.

A schema of trees is resident in the apparatus. The said schema of trees contains a first sub set of definitions for event handling instances defining various possible trees and sub trees representing the power builder format [DEFPB] and a second sub set of plurality of tree instances representing constructs in an open architecture format selected from C #, vb.net and JAVA programming language. [DEFOA]

There is also resident in the apparatus a set of mapping which defines the unique corresponding of a sub tree or tree instance representing the power builder format to at least one tree and sub tree instance representing the selected open architecture [MAP I].

The apparatus includes a tree translator means [TREE TRANSLATOR] adapted to receive tree instances representing the power builder format from the second model traverser, search in the schema of trees for a matching tree or sub tree instance using the set of mappings and upon locating a matching tree or sub tree instance transform the tree or sub tree instance in the power builder format to a tree instance in the selected format using the set of mappings using a tree transformer [Tree Transformer].

A third model traverser [Third Model Traverser] is provided which is adapted to pick up the transformed tree instance from the tree translator and further adapted to traverse the model and still further adapted to detach the trees attached to the event handling elements representing the power builder format and replace in the Model the said detached trees with the corresponding trees in the selected format.

An unparser [UNPARSER] is provided which includes a class generator [class generator] which is adapted to create classes in the selected format. A second set of mappings [MAP II] having a first set of rules [R1] for converting trees into concrete syntax of the selected format and a second set of rules [R2] for converting user interface elements in the generic form to concrete syntax in the selected format and a third set of rules [R3] to create a class for global variables is also provided. The unparser includes querying means [Querying] adapted to send and receive queries relating to information required for the creation of classes and its contents including its attributes, methods and bodies. A fourth model traverser [FOURTH MODEL TRAVERSER] is adapted to pick the user interface elements in the generic format in the model [MODEL] and global variables and send the picked elements to the unparser for class creation. The fourth model traverser has a query responding means [Query Responder] to respond to queries received from the querying means of the unparser for selectively filling the contents of the class with appropriate attributes and methods based on the responses relating to the events defined in the user interface elements and interdependencies between the elements, properties of the user interface element and bodies from responses relating to trees representing the selected format of the event handling element related to the event defined on the user interface element. and after all the classes [General Classes] have been created in [OPEN ARCHITECTURE CLASS FILES], the FOURTH MODEL TRAVERSER is further adapted to pick all the global variables from the user elements in the model and to pass it to the unparser to create a special class for all global variables [Global Variable Class]. Finally an emitter [Emitter] is provided for receiving in the open architecture format the classes of the said application and transferring the same to a storage means [Storage] for further use.

An Example illustrating the carrying out of the method of this invention

The method of this invention is exemplified by a small Task management in a Project in Power Builder application which needs to be migrated to C#.

There is one login screen in the task. Once users log into the application, they can create Projects, create Tasks for each Project they have created and monitor the status of the Task. There are screens for creation and maintenance of Employees. There are two reports. Project wise Task report and Employee wise Task report. The sample has 8 screens and one MDI window. It has one menu attached to the MDI frame. There are 8 DataWindow objects in the application and one global structure.

The PBLs of the application is fed to the Importer of the tool of this invention.

The importer then generates the SR files from the PBLs.
The receiver gets the following files.
timesheet.sra:
   The Application object.
d_chng_pwd.srd:
   Datawindow for Changing Password.
d_emp_mast.srd:
   Datawindow for Employee Screen.
d_emp_report.srd:
   Datawindow for Employee Report.
d_project_help.srd:
   Help window for Project.
d_project_mast.srd:
   Datawindow for Project screen.
d_project_report.srd:
   Datawindow for Project Report.
d_task_details.srd
   Datawindow for Task screen.
dddw_emp.srd:
   Dropdown Datawindow for Employee Screen.
m_main.srm:
   Main Manu
str_empattrib.srs:
   Structure to hold Employee Attributes
w_about.srw:
   About Screen.
w_chng_pass.srw:
   Change Password Screen
w_emp_report.srw:
   Employee Report
w_employee.srw:
   Employee Screen
w_login.srw:
   Login Screen
w_mdiframe.srw:
   MDI Window
w_project.srw
   Project Screen
w_project_report.srw:
   Project Report
w_report.srw:
   Ancestor for all Reports
w_super.srw:
   Ancestor for all windows
w_task_details.srw:
   Task Screen 1. The Parser I takes each of the files and generates the UI Model and the first model traverser traverse the model and trees are constructed by the tree builder which has second parser the model with the constructed tree are analyzed by a model analyzer and traversed to the model. Thus for each of the event code in UI model, invoking the Second Parser causes Constructs of the Tree Representation of the PowerScript code.
2. The parser is invoked for all the files and the model is built and stored in the memory.
3. The next step is to unparse the model and generate C# code. The Tree traverser comes into play and it invokes the second Model Traverser that traverses the UI Model. This second traverser traverses the model, and whenever it finds any Tree representation of the PowerScript code (or, event code), it invokes the Tree Translator and transforms the trees with the help of the schema and the map resident and transfers command to the third Model Traverser which is invoked after the first two has generated the C# Model into memory.
4. The third Model Traverser traverses the model for replacing the trees in the model in the C# format.
5. Now command is transferred to the fourth model trasverser which cooperates with an unparser model which has sub modules like the class generator, rule mapping module and a querying module. The querying module of the unparser communicates with the query responding module in the fourth model traverser and the Class Generator generates the C# classes for the POWER-BUILDER code. The following Classes have been generated for the Sample application.
  5.1.m_main.cs:
    5.1.1.Main Menu class
  5.2.str_empattrib.cs:
    Employee Attribute Structure
  5.3. timesheet.cs:
    Application controller class. This class contains the main method.
  5.4 w_about.cs:
    About Screen
  5.5 w_chng_pass.cs:
    Change Password screen
  5.6 w_emp_report.cs:
    Employee Report
  5.7 w_employee.cs
    Employee screen
  5.8 w_login.cs:
    Login screen
  5.9 w_mdiframe.cs:
    MDI Window
  5.10 w_project.cs:
    Project Screen
  5.11 w_project_report.cs:
    Project Report
  5.12 w_report.cs:
    Ancestor class for all the reports
  5.13 w_super.cs
    Ancestor for all the screens
  5.14 w_task_details.cs:
    Task Details screen After all classes are filled the fourth model traverses picks up the global variables from the model and the class generator then fills the global variable class.
  5.15. Global.cs:
    This class encapsulate all the Application level and public variables in PB Application.

Thus the application is now in the C# format. Finally the Emitter will generate the C# Project corresponding to the POWERBUILDER Application which will be stored in memory for further use.

The generated C# project was built on .Net platform and executed. During the execution, it behaved exactly as the original; POWERBUILDER application behaved in POWERBUILDER Environment.

Advantages of the use of the method and apparatus of this invention

Completeness

The method in accordance with this invention is based upon a strategy of capturing all the basic inputs, which are available to POWERBUILDER application to run the application in its basic form. This is achieved by making use of export facility of Power builder. This guarantees the completeness so far as the coverage of all application artifacts is concerned.

Guarantee of Correctness

The generated code in C# for powerscript code is guaranteed to be correct as the semantics equivalence has been taken into account while drawing the mapping. The conversion is not based upon any string pattern match replacement techniques which are not guaranteed to work in all contexts and different style of coding. The USER INTERFACE equivalence is also mapped after looking at the behavior of different controls in the two environments.

Flexibility

The built in features of POWERBUILDER application which do not have their counter part in C#, have been left as empty stubs. This facilitates the user to plug in their own solutions for such features. These could be developed in-house or can be taken from solutions offered by third party.

Time and Effort Saving

The end users who will use this tool will get following done automatically:
 a. Painting of screens in C# world
 b. Porting of business logic from Power script to C# world

The invention claimed is:

1. Method for automatically migrating client server application in a power builder binary format to an open architecture comprising the steps of:
 [a] importing the client server application in the power builder binary, format into a converter means and converting the binary format of the application to an ASCII character format;
 [b] receiving the client server application in the ASCII format in a form of a stream of characters;
 [c] parsing the stream of characters into a plurality of tokens and creating a stream of tokens, and composing the tokens into a plurality of constructs;
 [d] generating a model in a model generator by identifying the constructs and converting the constructs into (i) user interface elements in a generic form including their global variables and properties of the user interface elements and events defined on the user interface elements; (ii) flagged event handler elements in the power builder ASCII character format for each event in the user interface element; and (iii) inter element dependent relationships in the generic form; and mapping the generic user interface elements; the flagged event handler elements and the dependent relationships in the model;
 [e] analyzing the model and selectively picking the flagged event handler elements having constructs sequentially and transferring the event handler elements for tree building to a tree building means;
 [f] identifying constructs in the event handler elements and converting the event handling constructs into sub trees and further composing the sub trees into discrete event handling tree instances representing the power builder constructs, each tree instance corresponding to an event handler element;
 [g] picking up the tree instances built in the tree building means and attaching each of the discrete event handling tree instances to an event handler element associated therewith in the model;
 [h] again picking the attached tree instances representing the power builder constructs; and utilizing: [1] a schema of trees resident in an apparatus; said schema of trees containing a first sub set of definitions for event handling instances defining various possible trees and sub trees representing the power builder format and a second sub set of plurality of tree instances representing constructs in an open architecture format selected from C #, vb.net and bytecode programming language, [2] a set of mappings resident in the apparatus which defines unique corresponding of a sub tree or tree instance representing the power builder format to at least one tree and sub tree instance representing the selected open architecture; for transforming the tree or sub tree instance in the power builder format to a tree instance in the selected format by searching in the schema of trees for a matching tree or sub tree instance using the set of mappings;
 [i] picking up the transformed tree instance, detaching the trees attached to the event handler elements representing the power builder format and replace the said detached trees with the corresponding transformed trees in the selected format;
 [j] providing an unparser which includes a class generator which is adapted to create classes in the selected format, a second set of mappings having a first set of rules for converting trees into concrete syntax of the selected format and a second set of rules for converting user interface elements in the generic form to concrete syntax in the selected format and a third set of rules to create a class for global variables; querying means adapted to send and receive queries relating to information required for the creation of classes and its contents including its attributes, methods and bodies;
 [k] picking the user interface elements in the generic form in the model and global variables and sending the picked user interface elements to the unparser for class creation; by querying and responding to queries received from the querying means of the unparser and selectively filling the contents of the created classes with appropriate attributes and methods based on the responses relating to the events defined in the user interface elements and interdependencies between the user interface elements, properties of the user interface element and bodies from responses relating to trees representing the selected format of the event handler element related to the event defined on the user interface element; and after all the classes have been created, picking up all the global variables from the user interface elements in the model and passing them to the unparser for creating a special class for all global variables;
 [l] receiving the classes in the open architecture format the classes of the said application and transferring the classes in the open architecture format the classes of the said application to a storage means for further use.

2. Apparatus for carrying out a method for automatically migrating client server application in a power builder binary format to an open architecture consisting of:
 [a] importer means for receiving the client server application in the power builder binary format, said importer having a converter means to convert the binary format of the application to an ASCII character format;

[b] receiver means for receiving the client server application in the ASCII format in a form of a stream of characters;

[c] a first parser for parsing the stream of characters into a plurality of tokens and creating a stream of tokens, and composing the tokens into a plurality of constructs;

[d] a model generator for receiving from the first parser the said constructs, identifying the constructs and converting the constructs into (i) user interface elements in a generic form including their global variables and properties of the user interface elements and events defined on the user interface elements; (ii) flagged event handler elements in the power builder ASCII character format for each event in the user interface element; and (iii) inter element dependent relationships in the generic form; and mapping the generic user interface elements; the flagged event handler elements and the dependent relationships in a model;

[e] a model analyzer adapted to traverse the model and selectively pick the flagged event handler elements having constructs sequentially and further adapted to transfer the event handler elements to a tree building means;

[f] the tree building means for receiving the event handler element and its constructs; said tree building means having a second parser means for receiving the event handler elements identifying the constructs therein and sending the constructs to a tree constructor for converting the event handler constructs into sub trees and further composing the sub trees into discrete event handling tree instances representing the power builder constructs, each tree instance corresponding to an event handler element;

[g] a first model traverser which picks up the tree instances built in the tree building means and is adapted to attach each of the discrete event handling tree instances to an event handler element associated therewith in the model;

[h] a second model traverser adapted to traverse the model and pick the attached tree instances representing the power builder constructs;

[i] a schema of trees resident in the apparatus; said schema of trees containing a first sub set of definitions for event handling instances defining various possible trees and sub trees representing the power builder format and a second sub set of plurality of tree instances representing constructs in an open architecture format selected from C #, vb.net and bytecode programming language,

[j] a set of mappings resident in the apparatus which defines unique corresponding of a sub tree or tree instance representing the power builder format to at least one tree and sub tree instance representing the selected open architecture;

[k] a tree translator means adapted to receive tree instances representing the power builder format from the second model traverser, search in the schema of trees for a matching tree or sub tree instance using the set of mappings and upon locating a matching tree or sub tree instance and transform the tree or sub tree instance in the power builder format to a tree instance in the selected format using the set of mappings;

[l] a third model traverser which is adapted to pick up the transformed tree instance from the tree translator and further adapted to traverse the model and still further adapted to detach the trees attached to the event handler elements representing the power builder format and replace the said detached trees with the corresponding trees in the selected format;

[m] an unparser which includes a class generator which is adapted to create classes in the selected format, a second set of mappings having a first rules for converting trees into concrete syntax of the selected format and a second set of rules for converting user interface elements in the generic form to concrete syntax in the selected format and a third set of rules to create a class for global variables; querying means adapted to send and receive queries relating to information required for the creation of classes and its contents including its attributes, methods and bodies;

[n] a fourth model traverser means which is adapted to pick the user interface elements in the generic form in the model and global variables and send the picked user interface elements to the unparser for class creation; said fourth model traverser means having a query responding means to respond to queries received from the querying means of the unparser and sending the responses to the unparser for selectively filling the contents of the created classes with appropriate attributes and methods based on the responses relating to the events defined in the user interface elements and interdependencies between the user interface elements, properties of the user interface element and bodies from responses relating to trees representing the selected format of the event handler element related to the event defined on the user interface element; and after all the classes have been created, the fourth model traverser means is further adapted to pick all the global variables from the user interface elements in the model and to pass it to the unparser for creating a special class for all global variables;

[o] an emitter for receiving in the open architecture format the classes of the said application and transferring the classes of the said application in the open architecture format to a storage means for further use.

\* \* \* \* \*